(12) United States Patent
Home

(10) Patent No.: US 8,042,567 B2
(45) Date of Patent: Oct. 25, 2011

(54) GAS METER OF GAS CANISTER VALVE

(75) Inventor: William Home, Taipei (TW)

(73) Assignee: Grand Hall Enterprise Co., Ltd., Taipei (TW)

(*) Notice: Subject to any disclaimer, the term of this patent is extended or adjusted under 35 U.S.C. 154(b) by 340 days.

(21) Appl. No.: 12/420,832

(22) Filed: Apr. 9, 2009

(65) Prior Publication Data

US 2009/0301585 A1 Dec. 10, 2009

Related U.S. Application Data

(63) Continuation-in-part of application No. 12/135,223, filed on Jun. 9, 2008.

(51) Int. Cl.
*F16K 37/00* (2006.01)
(52) U.S. Cl. .......................... 137/551; 137/558; 116/227
(58) Field of Classification Search ................ 137/442, 137/551, 556, 558; 116/200, 204, 227, 265, 116/267, 305; 340/693.5, 693.9
See application file for complete search history.

(56) References Cited

U.S. PATENT DOCUMENTS

| | | | | |
|---|---|---|---|---|
| 2,992,560 A | * | 7/1961 | Morgan et al. ................ | 116/204 |
| 3,704,724 A | * | 12/1972 | Holbrook et al. ............. | 137/558 |
| 4,416,211 A | * | 11/1983 | Hoffman ....................... | 116/204 |
| 4,483,367 A | * | 11/1984 | Ross et al. .................... | 137/558 |
| 5,479,820 A | * | 1/1996 | Fekete .......................... | 116/305 |
| 5,821,869 A | * | 10/1998 | Schweitzer, Jr. ............. | 116/204 |
| 7,219,686 B2 | * | 5/2007 | Schmitz et al. ............... | 137/558 |
| 7,726,334 B2 | * | 6/2010 | Ross et al. .................... | 137/558 |
| 2007/0120701 A1 | * | 5/2007 | Teller .......................... | 340/693.9 |

* cited by examiner

*Primary Examiner* — Stephen M Hepperle
*Assistant Examiner* — Craig J Price
(74) *Attorney, Agent, or Firm* — Leong C. Lei

(57) ABSTRACT

A gas meter is mounted between vertical and horizontal branch tubes of a gas canister valve and has an indication pointer driven by a magnetic block that is movable inside the valve to indicate a residual quantity of gas inside the canister. The gas meter includes a casing that is magnetically non-conductive and forms at a top edge of a back thereof an inverted slope surface, an upper clamp extending from opposite sides of the inverted slope surface in an upward direction to clamp the vertical branch tube, and a side clamp engageable with the horizontal branch tube. The back of the meter casing is recessed at a location opposite to and interfering with an outer top edge of an enclosure for the magnetic block to form a fitting groove that corresponds to the top edge of the enclosure.

6 Claims, 7 Drawing Sheets

GAS METER OF GAS CANISTER VALVE

CROSS-REFERENCE TO RELATED APPLICATION

This is a continuation-in-part of the pending patent application Ser. No. 12/135,223, filed Jun. 9, 2008.

TECHNICAL FIELD OF THE INVENTION

The present invention generally relates to a gas meter for a gas canister valve, which is effectively strengthened for sideways supporting the gas meter on the gas canister valve so that the top edge of the meter casing can be more tightly positioned on the housing of the gas canister valve, making the meter pointer easier to be driven by the magnetic block, and which features that the meter face is set inclined upward for convenient downward viewing, and has the effects of quick and efficient inspection of the gas canister.

DESCRIPTION OF THE PRIOR ART

With the development of the modern society, natural gas is commonly used to replace coal for cooking. Although piping systems for delivering the natural gas have been widely set up, there are still areas where no such piping line is provided, such as remote outlaying areas or areas where construction for building the piping system is somehow difficult to carry out. For these areas, people who either live there or travel to there must carry their own gas canister that was previously filled up with gas in order to build up a fire for heating and cooking food. For remote outlying areas, the local availability of gas canister may be restricted. To ensure proper and un-interrupted supply of gas, one often needs to constantly check the residual amount of gas inside the gas canister that is being in use and coupled to a gas range or oven, so that timely purchase or replacement of the gas canister can be done.

It is important to a user that he or she can get immediately aware of the residual amount of gas inside a gas canister and this should not be done by hand raising and/or shaking the canister to assess the residual amount of gas, for it is dangerous and only provides a rough and non-precise estimation. To overcome such a problem, a gas meter that is positionable on a canister valve is available for measuring and indicating the residual amount of gas inside the canister, whereby a user can get precisely aware of the residual amount of gas and can be reminded of timely purchase of replacement canister. The mechanism for driving the gas meter is currently constructed with a magnetic block that is movable inside a gas canister valve and generates a magnetic force, which needs no physical contact, to drive an indication pointer of the gas meter by which the residual amount of gas inside the canister can be indicated by readings on the meter face. However, the currently available gas meter suffers insufficient support to maintain a back of a meter housing against the gas canister valve. Since the meter housing is not in tight engagement with the housing of the gas canister valve, the movement of the meter pointer driven by the magnetic block is retarded and of slow response. Further, the meter face is oriented to be substantially perpendicular to the horizontal, whereby a user must bend down his or her body to view the meter reading, especially when the meter is mounted to a short canister.

In view of these drawbacks of the conventional gas meter, the present invention aims to provide a gas meter to overcome these problems.

SUMMARY OF THE INVENTION

The present invention aims to provide a gas meter for a gas canister valve, which comprises a cylindrical container like casing that is magnetically non-conductive and forms at a top edge of a back thereof an inverted slope surface, an upper clamp extending from opposite sides of the inverted slope surface substantially in an upward direction to selectively and releasably clamp a vertical branch tube of the gas canister valve, the meter casing further forming a side clamp corresponding to the horizontal branch tube that is set opposite to a horizontally-extending gas outlet tube of the gas canister valve, the back of the meter casing being recessed at a location opposite to and interfering with an outer top edge of the magnetic block enclosure to form a fitting groove that corresponds in shape thereto to allow the top edge of the meter casing to be more tightly positioned against the housing of the gas canister valve and make the meter pointer easier to be driven by a magnetic block inside the valve housing and to orient the meter face in an inclined upward direction for easy downward viewing, whereby when the gas meter is mounted to a short gas canister, a user can simply bend down the head to direct his or her eyesight downward to obtain the reading of the meter pointer for realizing the residual amount of gas inside the canister and there is no need to bend down the body to check the meter face. This is the primary objective of the present invention.

A gas meter provided in accordance with the present invention for a gas canister valve features that the meter casing integrally forms at the side where the side clamp is formed an inclined arc wall connected with the side clamp to realize increased strength of supporting the side clamp. This is another objective of the present invention.

A gas meter provided in accordance with the present invention for a gas canister valve features that the upper clamp and the side clamp each comprise a resiliently deformable C-shaped clip having an opening facing a corresponding clamped portion of the gas canister valve, whereby the gas meter, after being mounted to the gas canister valve, can be detached from the gas canister valve by being forcibly pulled and can then be re-mounted to a gas valve of another canister for further use. This is a further objective of the present invention.

Further, a gas meter provided in accordance with the present invention for a gas canister valve features that the side clamp is a closed ring sized to exactly fit over a horizontal branch tube of the gas canister valve and the upper clamp is comprised of two semi-circular halves of a ring to be fit together, as undergoing slight elastic deformation, to effect clamping. One of the ring halves is integrally formed with the top edge of the back of the meter casing and is provided at an end thereof a pivot pin for rotatably jointing a corresponding end of the other ring half. The two ring halves have other ends, which are opposite to the ends provided with the pivot pin, respectively provided with a resilient locking projection and a corresponding locking hole engageable with each other, whereby the gas meter, once mounted to the gas canister valve, can be securely locked and fixed, and is protected from separation caused by impacts occurring during transportation or shakes occurring in being positioned onto the ground. This is an alternative form of the present invention to realize secured locking.

Further, a gas meter provided in accordance with the present invention for a gas canister valve can be alternatively embodied to facilitate ready mounting and efficient dismounting for conveniently carrying out inspection operation, wherein both the upper clamp and the side clamp are formed as clips of short curved lips having an opening facing a corresponding clamped portion of the gas canister valve, whereby the upper clamp and the side clamp of the gas meter can be hand held to position against and partly fit over the corresponding clamped portions of the horizontal branch tube and the vertical branch tube of the gas canister valve. In this way, the gas meter is not fixedly mounted to a specific gas canister and a user, with an attempt to change the gas canister that is believed to be consumed up, can conveniently bring the gas meter to a gas canister yard to check the quantity of gas inside a canister by efficiently positioning the gas meter against the gas canister valve of the used canister or the gas canister valve of a new canister, so that efficient removal of the gas meter can be realized for quickly checking the canisters. This is yet a further objective of the present invention.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
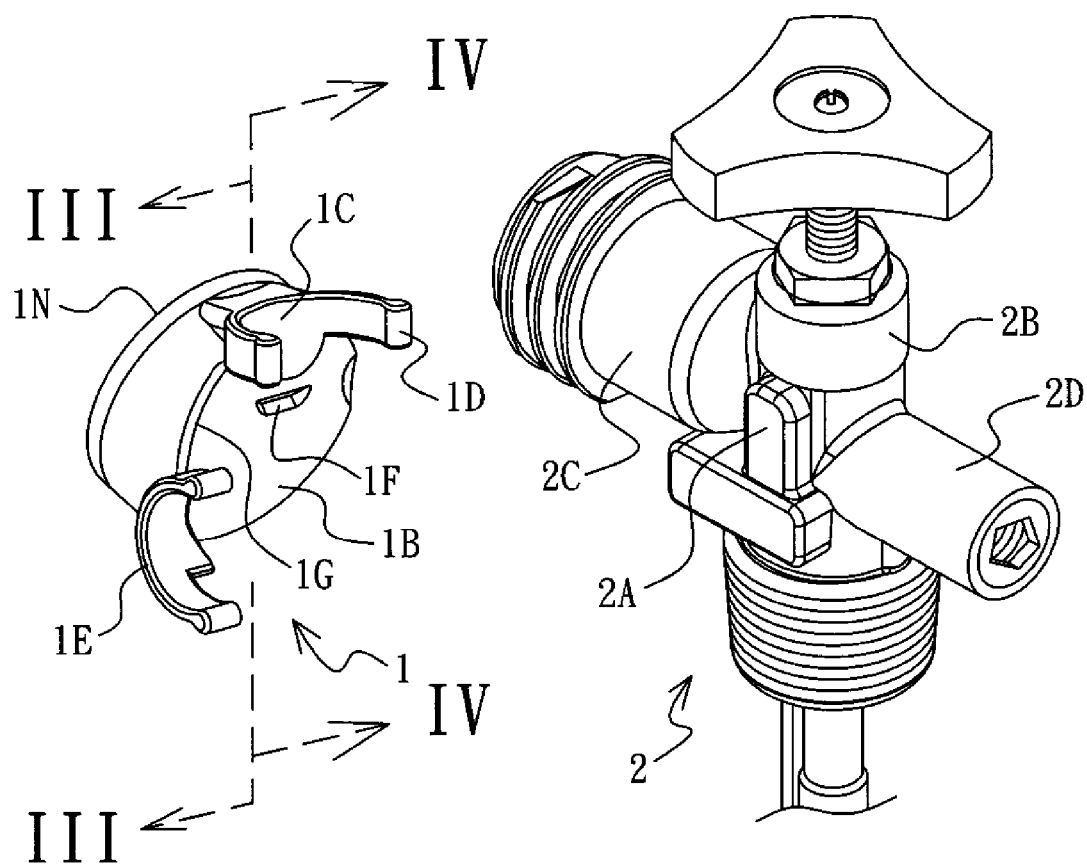
FIG. 1 is a perspective view of a gas meter constructed in accordance with the present invention for a gas canister valve.
Figure 2:
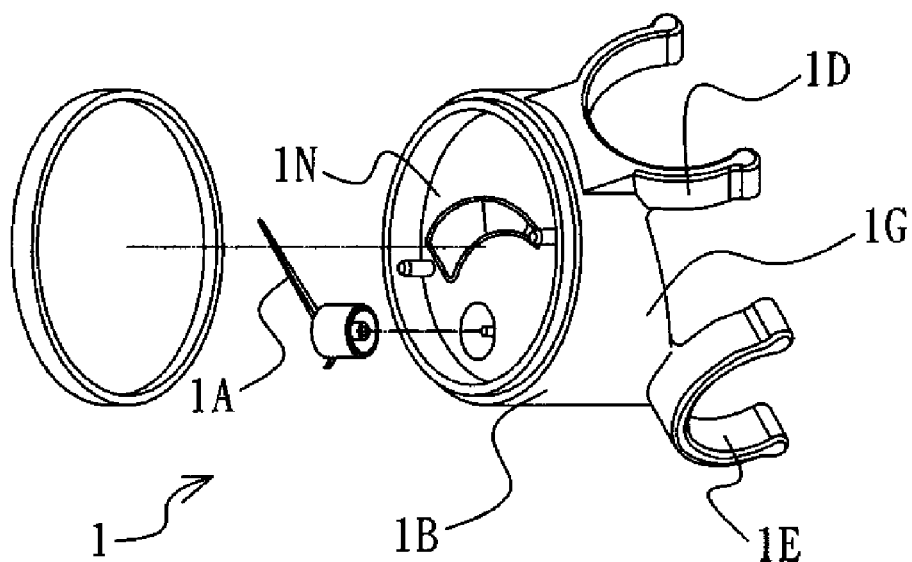
FIG. 2 is an exploded view of the gas meter of the present invention with a pointer being detached.
Figures 3, 4:
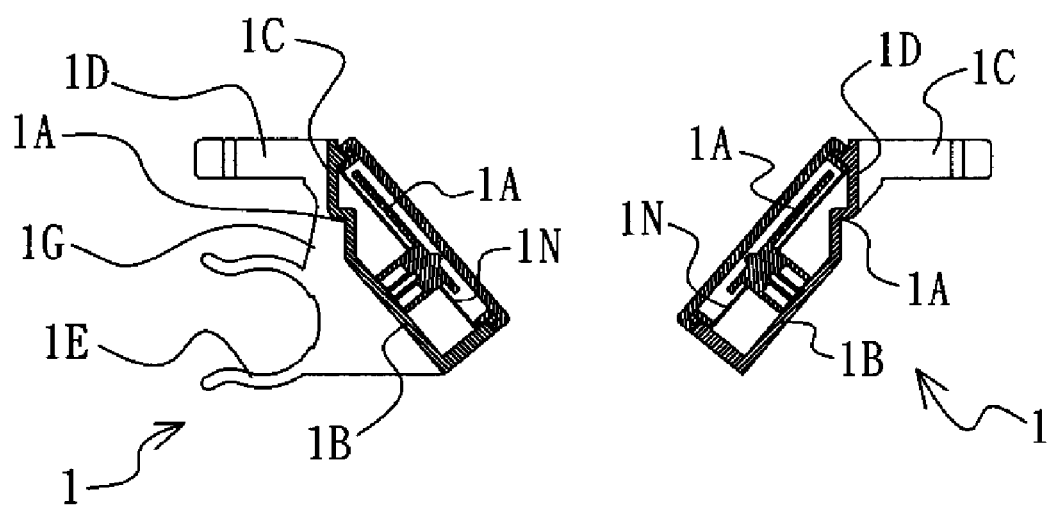
FIG. 3 is a cross-sectional view taken along line III-III of FIG. 1.
FIG. 4 is a cross-sectional view taken along line IV-IV of FIG. 1.

With reference to the drawings and in particular to FIG. 1, which is a rear side perspective view of a gas meter constructed in accordance with the present invention for mounting to a valve of a gas canister; FIG. 2, which is an exploded view of the gas meter; and FIGS. 3 and 4, which are cross-sectional views of the gas meter, the gas meter constructed in accordance with the present invention, generally designated at 1, is provided for mounting to a gas canister valve 2 between a vertical branch tube 2B and a horizontal branch tube 2D to be driven by a magnetic block that is movable inside the canister valve 2 for moving an indication pointer 1A to indicate the amount or quantity of gas residual inside the gas canister. (The magnetic block is not shown in the drawings and is movably set in an internal chamber defined in a magnetic block enclosure 2A shown in FIG. 1.) The gas meter 1 has a cylindrical container like casing 1B that is magnetically non-conductive and forms at a top edge of a back thereof an inverted slope surface 1C. An upper clamp 1D extends from opposite sides of the inverted slope surface 1C substantially in an upward direction to selectively and releasably clamp the vertical branch tube 2B. The meter casing 1B also forms a side clamp 1E corresponding to the horizontal branch tube 2D that is set opposite to a horizontally-extending gas outlet tube 2C of the gas canister valve. As shown in the drawings, the upper clamp 1D and the side clamp 1E are both comprised of a resiliently deformable C-shaped clip having an opening facing a corresponding clamped portion of the gas canister valve 2.

Figure 5:
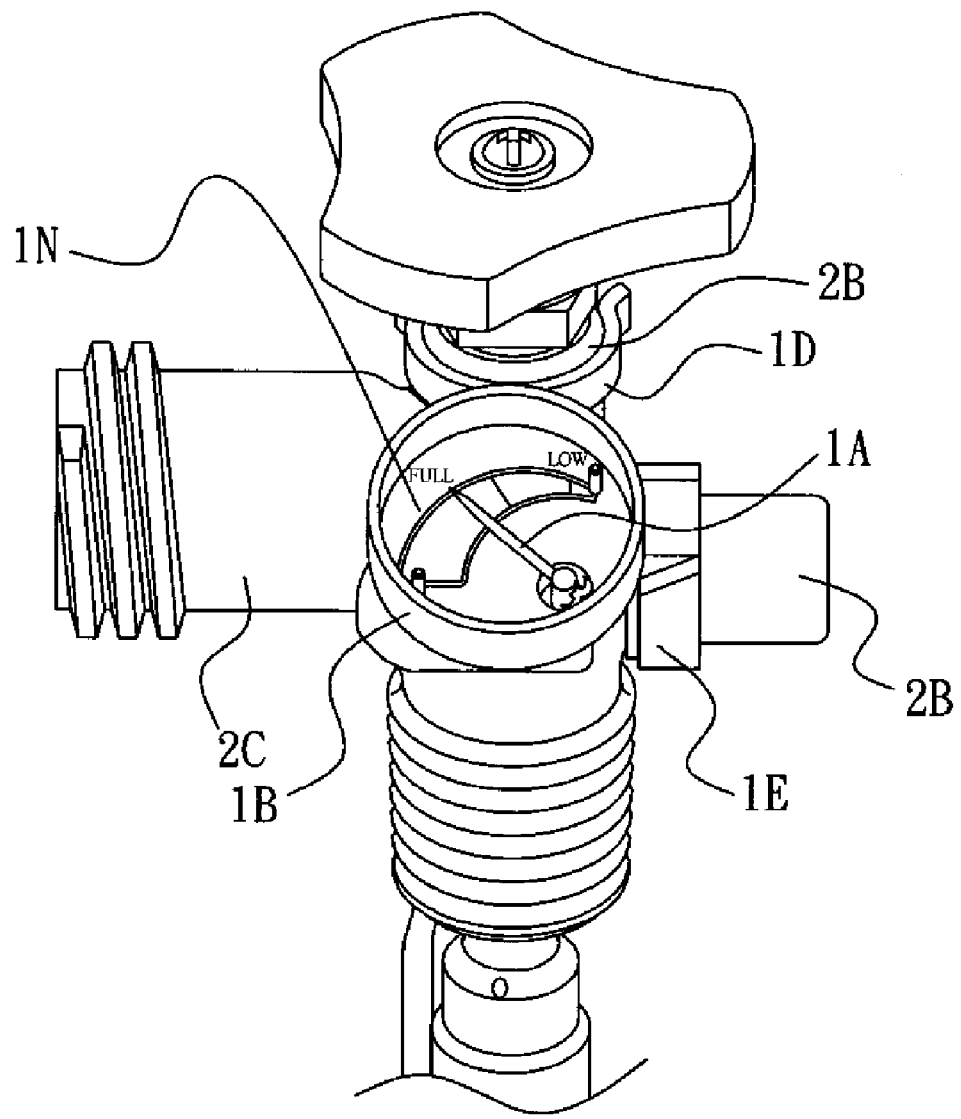
FIG. 5 is a perspective view illustrating a practical application of the gas meter of the present invention.

The back of the meter casing 1B is recessed, at a location opposite to and interfering with an outer top edge of the magnetic block enclosure 2A, to form a fitting groove 1F that corresponds in shape to the outer top edge of the magnetic block enclosure 2A. The meter casing 1B also integrally forms, at the side where the side clamp 1E extends, an inclined arc wall 1G connected with the side clamp 1E to strengthen the support to the side clamp 1E. With the inverted slope surface 1C and the fitting groove 1F, the gas meter 1 can be installed as demonstrated in FIG. 5 that shows a perspective view of a practical application of the gas meter 1 by having the upper clamp 1D engaging the vertical branch tube 2B and the side clamp 1E engaging the horizontal branch tube 2D to thereby more tightly position the top edge of the meter casing 1B against a valve housing of the gas canister valve 2, allowing the pointer 1A to be more easily and magnetically driven by the magnetic block. Also, a meter face 1N of the gas meter 1 is set inclined upward to help a user to read the reading of gas quantity from the meter.

Figure 6:
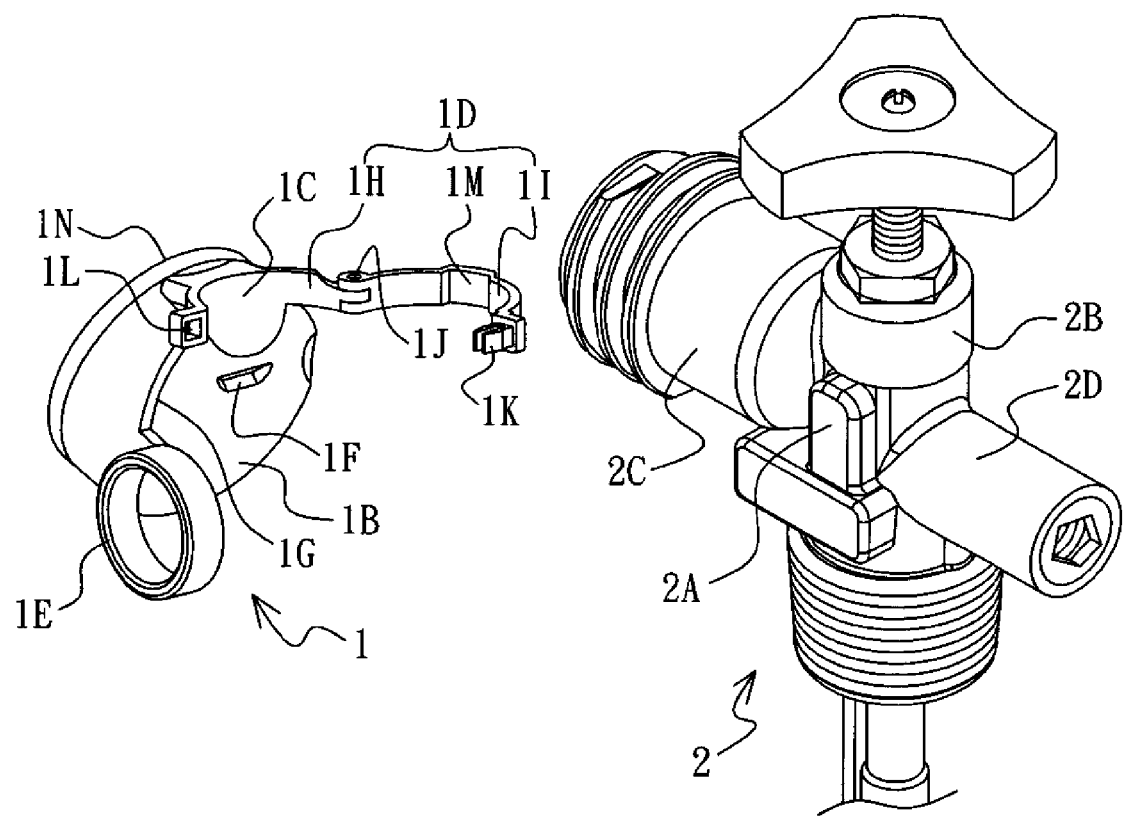
FIG. 6 is a perspective view of a gas meter constructed in accordance with a different embodiment of the present invention for a gas canister valve.

The present invention can be alternatively embodied as shown in FIG. 6, wherein the side clamp 1E' is a closed ring sized to exactly fit over the horizontal branch tube 2D and the upper clamp 1D' is comprised of two semi-circular halves 1H, 1I of a ring to be fit together, preferably undergoing slight elastic deformation, to effect clamping. One ring half 1H is integrally formed with the top edge of the back of the meter casing and is provided at an end thereof a pivot pin 1J for rotatably jointing a corresponding end of the other ring half 1I. The two ring halves 1H, 1I have other ends, which are opposite to the ends provided with the pivot pin 1J, respectively provided with a resilient locking projection 1K and a corresponding locking hole 1L engageable with each other. The ring half 1I that is not integrally formed with the top edge of the back of the meter casing 1B forms, on a middle section thereof, an integrally-formed outward-bulged resilient curved arm 1M to provide additional curved arm length and clamping resilience for helping clamping on a vertical branch tube 2B of a larger tube size.

Figure 7:
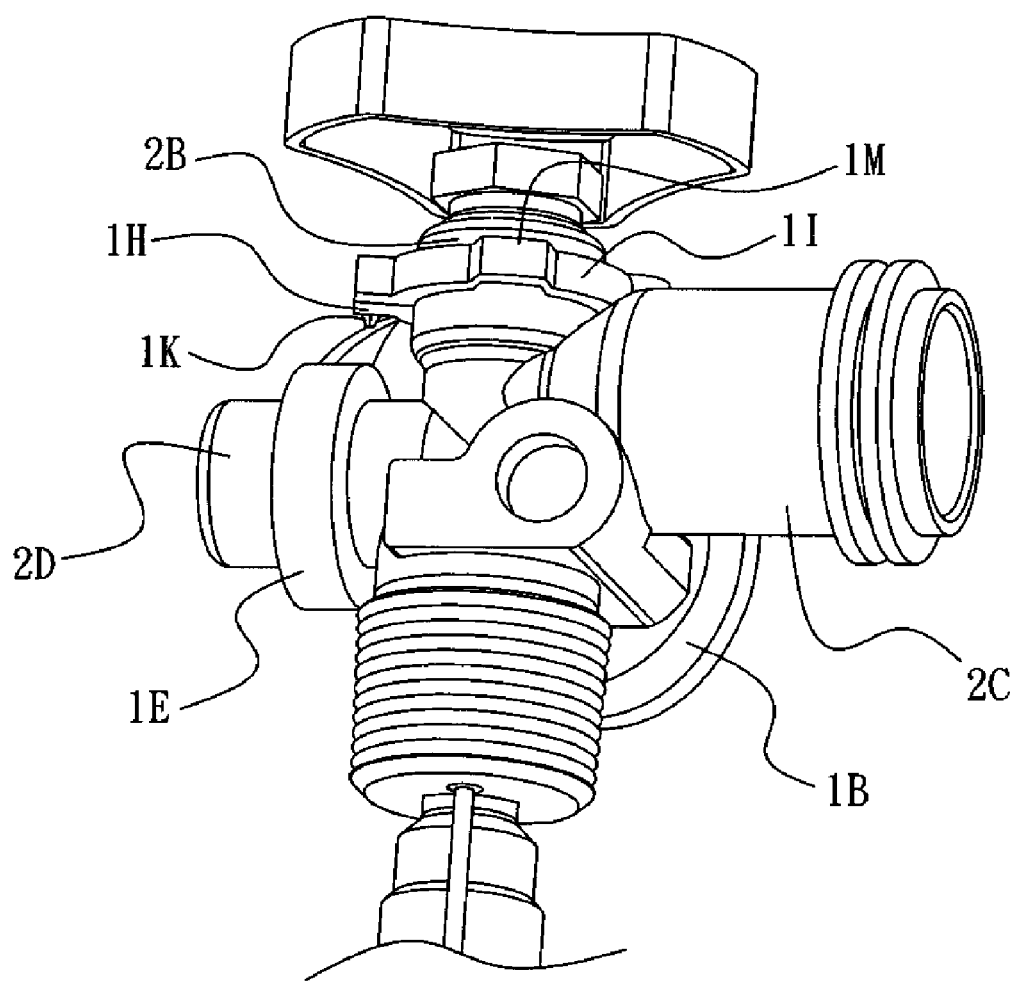
FIG. 7 is a perspective view illustrating a practical application of the gas meter in accordance with the different embodiment of the present invention.

With such a structure, to clamp the gas meter 1 to the gas canister valve 2, the two ring halves 1H, 1I are first opened, and with the meter face 1N set at an angular position where the upper clamp 1D' does not interfere with the horizontal branch tube 2D, the closed-ring like side clamp 1E' is moved horizontally to fit over the horizontal branch tube 2D and then the meter face 1N is angularly moved to such a position where the ring half 1I that is located on the back side of the vertical branch tube 2B and can be moved forward to lock to the ring half 1H on the front side of the vertical branch tube 2B by having the resilient locking projection 1K engage the locking hole 1L, as illustrated in FIG. 7, whereby the gas meter 1, once mounted to the gas canister valve 2, can be securely locked and fixed, and is protected from separation caused by impacts occurring during transportation or shakes occurring in being positioned onto the ground.

Figure 8:
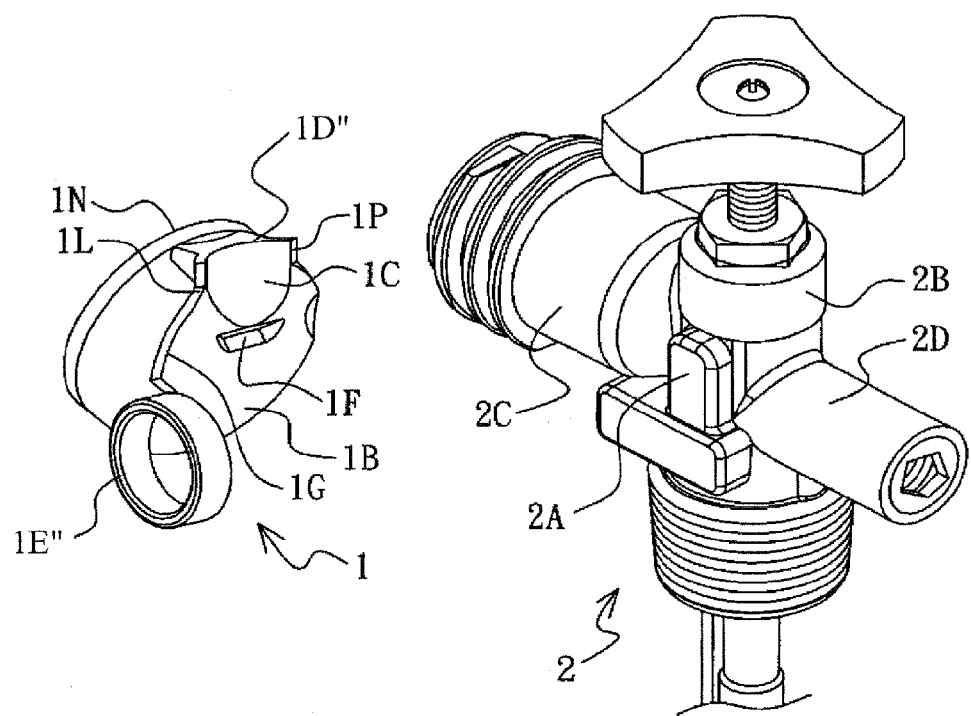
FIG. 8 is a perspective view of a gas meter constructed in accordance with a further different embodiment of the present invention for a gas canister valve.

The gas meter provided in accordance with the present invention for a gas canister valve can be alternatively embodied as shown in FIG. 8, wherein the side clamp 1E is formed as a closed ring that is sized to snugly fit over the horizontal branch tube 2D and the upper clamp 1D" comprises a curved wall 1P having opposite ends extending beyond the inverted slope surface 1C, and the fitting groove 1F formed in the meter casing 1B is made deeper. With such a construction, to mount the gas meter 1 to the gas canister valve 2, the side clamp 1E" is horizontally moved to fit over the horizontal branch tube 2D to such a position where the curved wall 1P partly fits over the vertical branch tube 2B, thereby effecting clamping on the valve.

Figure 9:
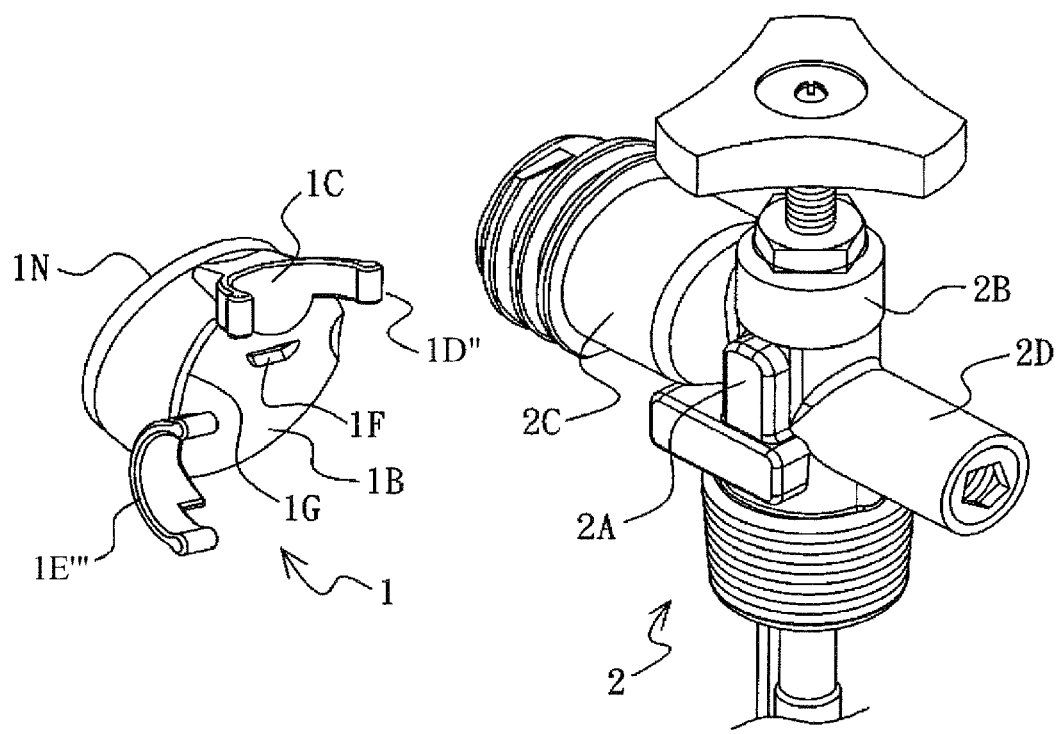
FIG. 9 is a perspective view of a gas meter constructed in accordance with yet a further different embodiment of the present invention for a gas canister valve.

The gas meter provided in accordance with the present invention for a gas canister valve can be alternatively embodied as shown in FIG. 9, wherein both the upper clamp 1D" and the side clamp IE" are formed as clips of short curved lips having an opening facing a corresponding clamped portion of the gas canister valve 2, whereby the upper clamp 1D" and the side clamp IE''' of the gas meter 1 can be hand held to position against and partly fit over the corresponding clamped portions of the horizontal branch tube 2D and the vertical branch tube 2B. In this way, the gas meter 1 is not fixedly mounted to a specific gas canister and a user, with an attempt to change the gas canister that is believed to be consumed up, can conveniently bring the gas meter 1 to a gas canister yard to check the quantity of gas inside a canister by efficiently positioning the gas meter 1 against the gas canister valve 2 of the used canister or the gas canister valve 2 of a new canister, and then the gas meter 1 can be readily removed from the gas canister valve for quickly checking the canisters.

To summarize, the present invention provides a gas meter for a gas canister valve, which is effectively strengthened for sideways supporting the gas meter on the gas canister valve so that the top edge of the meter casing can be more tightly positioned on the housing of the gas canister valve, making the meter pointer easier to be driven by the magnetic block. Further, the meter face is set inclined upward for convenient downward viewing. The gas meter can also be made for quick and efficient inspection of the gas canister.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A gas meter for a valve of a gas canister and being adapted to mount between a vertical branch tube and a horizontal branch tube of the gas canister valve to be driven by a magnetic block that is movable inside the gas canister valve for moving an indication pointer of the gas meter to indicate a residual quantity of gas inside the gas canister, the gas meter being characterized in that the gas meter comprises a cylindrical container like casing that is magnetically non-conductive and forms at a top edge of a back thereof an inverted slope surface, an upper clamp extending from opposite sides of the inverted slope surface substantially in an upward direction to selectively and releasably clamp the vertical branch tube of the gas canister valve, the meter casing forming a side clamp corresponding to the horizontal branch tube that is set opposite to a horizontally-extending gas outlet tube of the gas canister valve, the back of the meter casing being recessed at a location opposite to and interfering with an outer top edge of the magnetic block enclosure to form a fitting groove that corresponds in shape to the outer top edge of the magnetic block enclosure, the meter casing integrally forming at the side where the side clamp extends an inclined arc wall connected with the side clamp.

2. The gas meter according to claim 1, wherein the upper clamp and the side clamp each comprise a resiliently deformable C-shaped clip having an opening facing a corresponding clamped portion of the gas canister valve.

3. The gas meter according to claim 1, wherein the side clamp comprises a closed ring sized to fit over the horizontal branch tube and the upper clamp comprises two semi-circular halves of a ring to be fit together, selectively undergoing slight elastic deformation, to effect clamping, one ring half being integrally formed with the top edge of the back of the meter casing and provided at an end thereof a pivot pin that rotatably joints a corresponding end of the other ring half, the two ring halves having other ends, which are opposite to the ends provided with the pivot pin, respectively provided with a resilient locking projection and a corresponding locking hole engageable with each other.

4. The gas meter according to claim 3, wherein said other one of the ring halves that is not integrally formed with the top edge of the back of the meter casing forms, on a middle section thereof, an integrally-formed outward-bulged resilient curved arm.

5. The gas meter according to claim 1, wherein the side clamp is formed as a closed ring that is sized to snugly fit over the horizontal branch tube and the upper clamp comprises a curved wall having opposite ends extending beyond the inverted slope surface, and wherein the fitting groove is formed in the meter casing with an increased depth.

6. The gas meter according to claim 1, wherein the upper clamp and the side clamp are formed as clips of short curved lips having an opening facing a corresponding clamped portion of the gas canister valve.

* * * * *